United States Patent [19]

Fentress et al.

[11] Patent Number: 4,711,517
[45] Date of Patent: Dec. 8, 1987

[54] METHOD AND APPARATUS FOR INSTALLING FIBER OPTIC CABLES

[76] Inventors: Vernon A. Fentress, 4515 Ewing Rd., Castro Valley, Calif. 94546; Darryl A. Dawson, 798 McAllister St., San Francisco, Calif. 94102

[21] Appl. No.: 791,437

[22] Filed: Oct. 25, 1985

Related U.S. Application Data

[63] Continuation-in-part of Ser. No. 740,189, May 31, 1985, abandoned.

[51] Int. Cl.$^4$ .................. G02B 6/36; G02B 7/26
[52] U.S. Cl. .................. 350/96.20; 350/96.21
[58] Field of Search .............. 350/96.20, 96.21, 96.22, 350/96.23; 411/511

[56] References Cited

U.S. PATENT DOCUMENTS

| | | | |
|---|---|---|---|
| 3,132,557 | 5/1964 | Bauer | 411/511 |
| 4,447,121 | 5/1984 | Cooper et al. | 350/96.20 |
| 4,487,474 | 12/1984 | Nishie et al. | 350/96.21 |
| 4,526,438 | 7/1985 | Essert | 350/96.21 |

Primary Examiner—William L. Sikes
Assistant Examiner—Robert E. Wise
Attorney, Agent, or Firm—Malcolm B. Wittenberg

[57] ABSTRACT

A new and improved apparatus and method for use in installing fiber optic cable, which utilizes a novel connector-coupling nut assembly, is disclosed herein. The apparatus largely comprises an elongated connector body with means disposed about the body's circumference for receiving and retaining a coupling nut which has a similar internal configuration for mating with the elongated connector body. When received by the connector body, the novel coupling nut is held in a securely captive position along the elongated connector body by suitable retaining means configured about the exterior surface of the connector body and the interior surface of the coupling nut, which means interact with each other.

7 Claims, 15 Drawing Figures

METHOD AND APPARATUS FOR INSTALLING FIBER OPTIC CABLES

CROSS REFERENCE TO RELATED APPLICATION

This is a continuation-in-part, application of U.S. Ser. No. 740,189 filed May 31, 1985, now abandoned.

TECHNICAL FIELD

This invention relates to a method and apparatus for installing preconnectorized fiber optic cables. More particularly, the invention relates to a novel connector-coupling nut assembly which allows for factory connectorization of fiber optic cables and for ease of cable installation in the field by providing for a reduced installation profile for the connector bundle.

BACKGROUND ART

Typically, fiber optic cables installed in or between buildings to enable intra-organizational data and telephone communications are housed in conduits and connected with dematable connectors. The benefits of fiber optics for use in these local networks are many; however, the primary benefit lies in the ability to send the information of many telecommunication instruments over an exceedingly small number of channels as compared to conventional copper cables. A single pair of optical fibers may, in fact, replace several hundred pairs of copper cables.

Because of the present tendency toward high capacity small cables, fiber optic cables are often installable where conventional copper or coaxial cables of equivalent capacity will not fit, e.g., small or congested cable ducts. Copper or coaxial cable bundles as large as 100 mm in diameter can be avoided in favor of fiber optic cables as small as 8 mm in diameter.

Unfortunately, single channel dematable fiber optic connectors used to terminate the cable are typically 8 to 20 millimeters in diameter. This results in connector bundle sizes several times the diameter of the cable. For example, a typical AT&T Technologies connector used to terminate a typical 6 channel, 8 mm diameter, fiber optic cable will result in a bundle size of 36.7 mm which is over four (4) times the size of the cable. The National Electrical Code limits a single cable to 53% of the conduit area. Thus, the 8 mm cable can easily fit a ½ inch standard conduit. The same cable with preinstalled connectors would require a 1½ inch standard conduit just to clear the connector bundle. Pulling equipment may dictate an even larger size conduit. The existence of previously installed cable and/or a series of 90° conduit bends might raise the required conduit size even higher. To compound these problems, the typical cable grip used to install cables in conduits does not expand more than a few percent larger than the minimum allowable cable diameter, i.e., it will not fit over a connector bundle with a diameter more than a few percent larger than the cable diameter.

This situation has almost universally resulted in field connectorization (as opposed to the more desirable factory connectorization) of duct-installed fiber optic cables. Unfortunately, to install the typically epoxy and polish connector takes approximately 20 to 40 minutes per end (two ends per connection) requiring approximately 40 separate steps. For example, some of these required steps include: (1) stripping the jacket away from the cable; (2) folding back the Kevlar material and stripping the buffer material; (3) cleaving or putting a break in the fiber such that the break is perpendicular to the axis of the fiber; (4) cementing the fiber inside of the connector with epoxy; and (5) polishing the fiber optic connector. The connectors may each cost as much as $25.00 or more. An incorrect installation or accidental breakage of the fragile fiber may necessitate that the connector be cut off, discarded and a new installation procedure begun having to again perform all of the time-consuming steps including that of polishing the connector which is perhaps the most time-consuming. As a result, field installation of dematable connectors is performed by highly skilled personnel. It is not uncommon for this connectorization to be done by highly skilled, degreed engineers.

DISCLOSURE OF THE INVENTION

In view of the foregoing problems, it is apparent that there is a need in the fiber optic art and industry for an improved apparatus and method for installing fiber optic cables which would allow for the tedious and time-consuming connectorization of fiber optic cables in the factory prior to the field installation of the cable.

Accordingly, we have invented a new and improved method and apparatus which primarily comprises a novel connector-nut assembly which connector may be assembled on the fiber optic cable in the factory where all of the tedious steps to prepare the cable and connector may be done.

It is, therefore, an object of the present invention to provide a means of reducing both the cost and complexity of fiber optic cable duct installation by enabling factory performance of the complex fiber/connector mate and polish process, while field personnel can use conventional cable installation equipment and processes to place the preconnected cable in the customer's conduit.

According to one aspect of the present invention, there is provided a cable containing at least one optical fiber sub-unit. The optical fiber sub-unit is secured to a connector body. The fiber is polished or otherwise made smooth and flat, possibly with the device described in the third aspect of this invention. The connector body is provided with two circumferential grooves at its midsection, both containing retaining rings. At this point, the connector bundle assembled on the cable has its smallest profile facilitating the easiest installation in the cable conduit. After installation, the connector coupling nut used to mate and demate the connector bodies is seated between the retaining rings seated in the circumferential grooves on the connector body.

Alternatively, the connector body may be provided with a single circumferential groove at its midsection. After the installation of the cable/connector assembly in the cable duct, this groove may be used to seat a matching expansion ring captivated in the back end of the coupling nut.

According to another aspect of this invention, there is provided a removable nut assembly for checking the continuity of the cable before installation of the cable and the permanent nut. This removable nut can also be used for polishing the fiber end before the cable is installed in the conduit.

According to yet another aspect of this invention, the removable nut feature is combined with the permanent nut design resulting in what amounts to a removable, permanent nut which can be employed for factory polishing of the connector as well as for permanent installation of the cable.

BRIEF DESCRIPTION OF THE DRAWINGS

FIG. 2a is a cross-section of the coupling nut of FIG. 1a.

FIG. 2b is a front elevational view of the coupling nut of FIGS. 2a and 1a.

BEST MODE FOR CARRYING OUT THE INVENTION

Reference is made to FIGS. 1a, 2, 3 and 7a of the drawings in detail which show one embodiment of the connector assembly of the present invention generally designated 10. The assembly comprises a combined fiber optic connector body 11 and coupling nut 12. The assembly is mated to a fiber optic cable 13 with a crimp coupling 14. The fiber optic cable contains a fiber 15, with a polished or otherwise well prepared end 20, covered by a buffer coating 21 which is partially stripped back to point 27 for fiber end preparation. The fiber optic cable 13 may be a subunit of a multi-fiber cable in which case the connector assembly may be one of several connectors terminating the multi-fiber cable end. A compression ring 22 occupies an annular groove 23. In its relaxed state the compression ring 22 has an outer diameter 31 slightly smaller than the outer diameter 24 of the bevelled land 30 of the coupling nut 12. The inner diameter of the compression ring 22 is determined by the trough of several radial dimples 32 (FIG. 7a) and is roughly equivalent to the inner diameter 23 of the groove in which the compression ring is seated. These radial dimples 32 keep the ring 22 centered about the bottom of the groove 23.

Figure 1A:
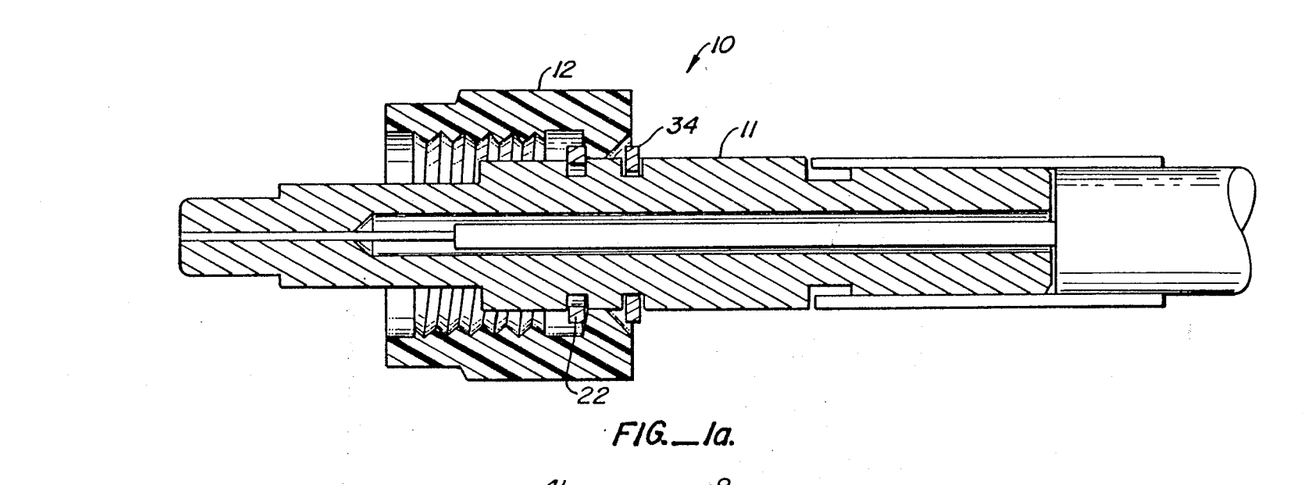
FIG. 1a is a cross-section of the connector and coupling nut in a captured condition for one embodiment of the invention.
Figure 3:
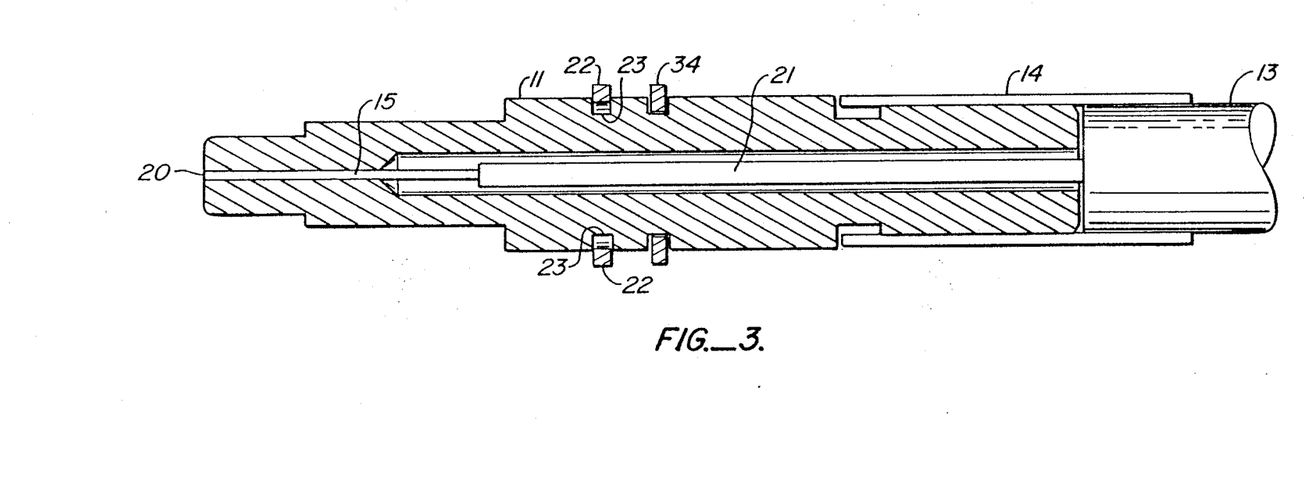
FIG. 3 is a cross-section of the connector body of FIG. 1a without the coupling nut of FIG. 2.

The connector body is installed with the cable in the cable conduit. After this installation, the coupling nut 12 is installed to enable connection of the cable. The coupling nut is installed by placing the bevelled land 30 of the nut 12 over the fiber end 20 of the connector body 11 and sliding it down along the body of the connector until the bevelled land 30 rests against the compression ring 22. Pressure against the nut in the direction of the compression ring causes the ring to flex inward towards the bottom of groove 23 as it slides into the funnel of the bevelled land 30. After passing through diameter 25, the ring will snap back to its original configuration in groove 23, retaining the nut 12 against retainer 34 which can be either a retaining clip in a groove or a shoulder on the connector.

Figure 4:
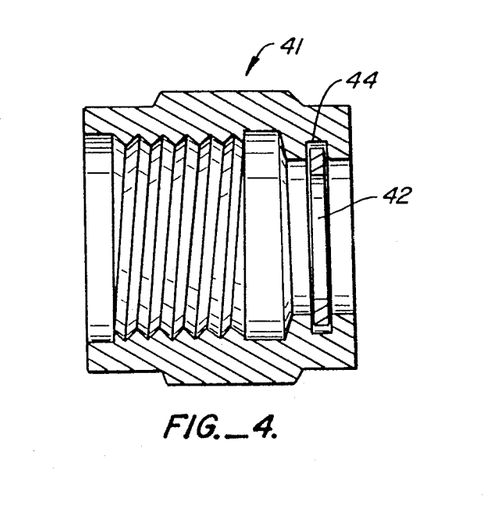
FIG. 4 is a cross-section of the coupling nut of FIG. 1b.
Figure 5:
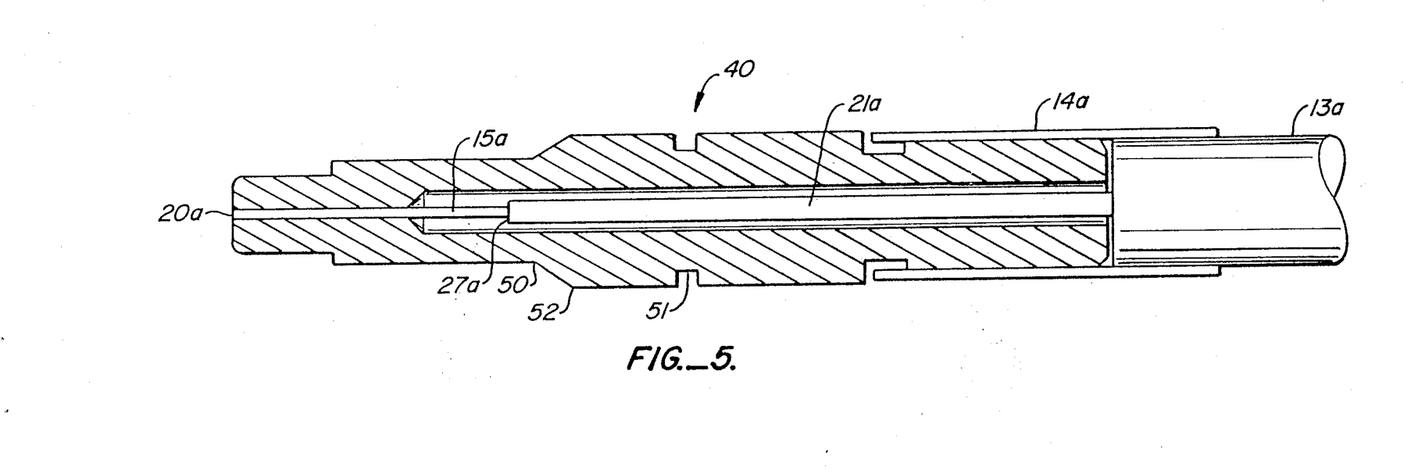
FIG. 5 is a cross-section of the connector body of FIG. 1b and 8b.

In a further embodiment of the present invention, reference is made to FIGS. 1b, 4, 5 and 7b of the drawings in detail. The connector-nut assembly, generally designated by reference numeral 9, comprises a combined fiber optic connector body 40 and coupling nut 41. Referring to FIG. 5, the assembly is mated to a fiber optic cable 13a with a crimp coupling 14a. The fiber optic cable contains a fiber 15a with a polished or otherwise well prepared end 20a covered by a buffer coat 21a which is partially stripped back to point 27a to facilitate fiber end preparation. As previously described, the fiber optic cable 13a may be a sub-unit of a multi-fiber cable in which the connector 9 may be one or several connectors terminating the multi-fiber cable end.

Figure 7A:
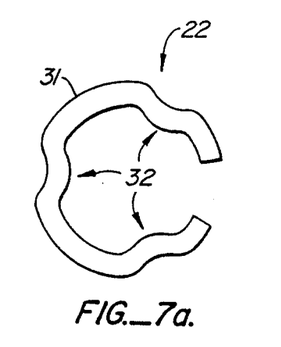
FIGS. 7a, 7b and 7c are views of the spring rings and spring clip necessary to engage the coupling nuts of FIGS. 2, 4 and 8a onto the connector bodies of FIGS. 3 and 5, respectively.
Figure 7B:
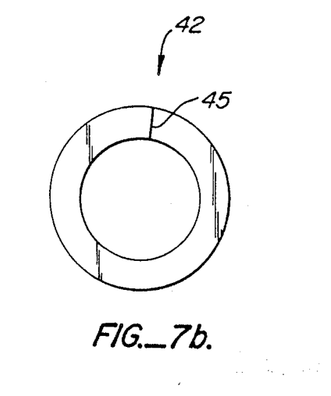

Referring to FIGS. 4, 5 and 7b, a spring expansion ring 42, a detailed illustration of which is shown in FIG. 7b, occupies an inner groove 44 of the coupling nut 43. Coupling nut 43 has a cross-section similar to that shown in FIG. 2b. The spring expansion ring 42 has a split 45 which opens upon expansion. The inner diameter of the ring is slightly larger than the diameter of the connector body of FIG. 5 at the base of the groove 51.

When in operation, the coupling nut 43 has spring expansion ring 42 positioned in groove 44. Coupling nut 43 with spring expansion ring 42 is slid over the end 20a of the connector body 9 (see FIG. 1b) and down to ramp 50 and ramp crest 52. As the unit assembly is forced past the ramp area, ramp 50 itself expands the inside diameter of ring 42 to the diameter of the ramp crest 52. At this point the outside diameter of spring expansion ring 42 is somewhat less than the diameter of the inner groove 44 of the coupling nut 43. The coupling nut is then forced toward the cable end (generally shown at 13a)- of the connector body until spring expansion ring 42 snaps into groove 51. As the diameter of the base of groove 51 is slightly smaller than the inside diameter of the spring expansion ring 42, the spring expansion ring will return to its original condition with split 45 closed. This configuration and embodiment has the added advantage of allowing for a waterproof coupling when connector assembly 9 is mated.

Figure 1B:
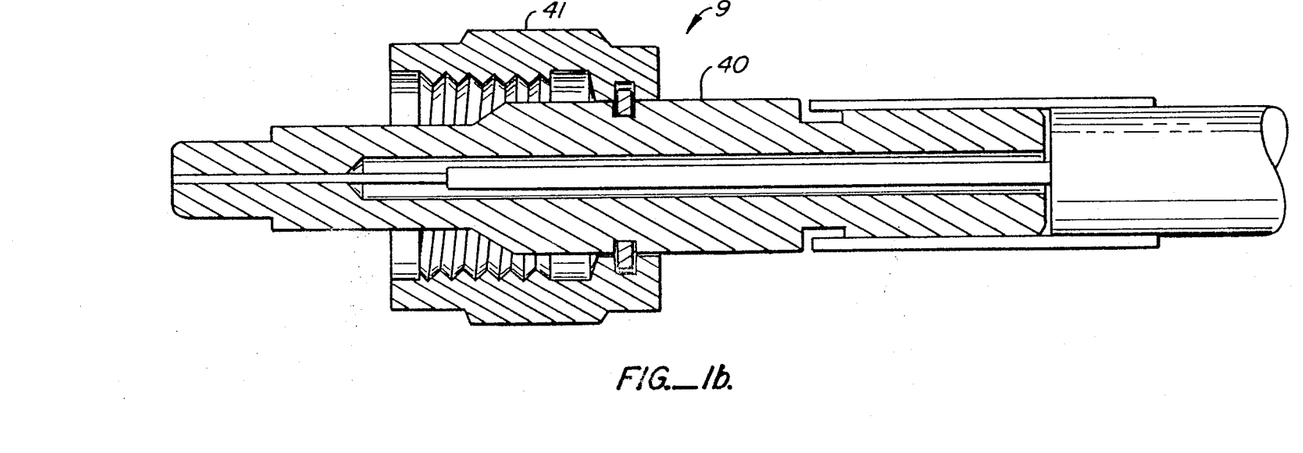
FIG. 1b is a cross-section of the connector and coupling nut in the captured condition for another embodiment of the invention.
Figure 2A:
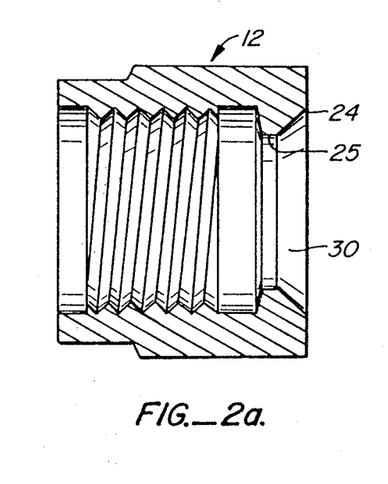
Figure 2B:
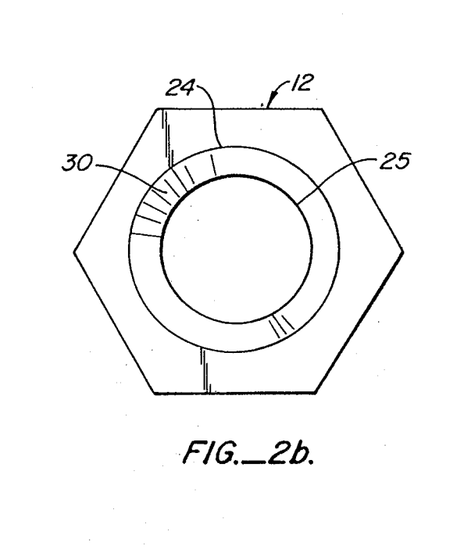
Figure 6A:
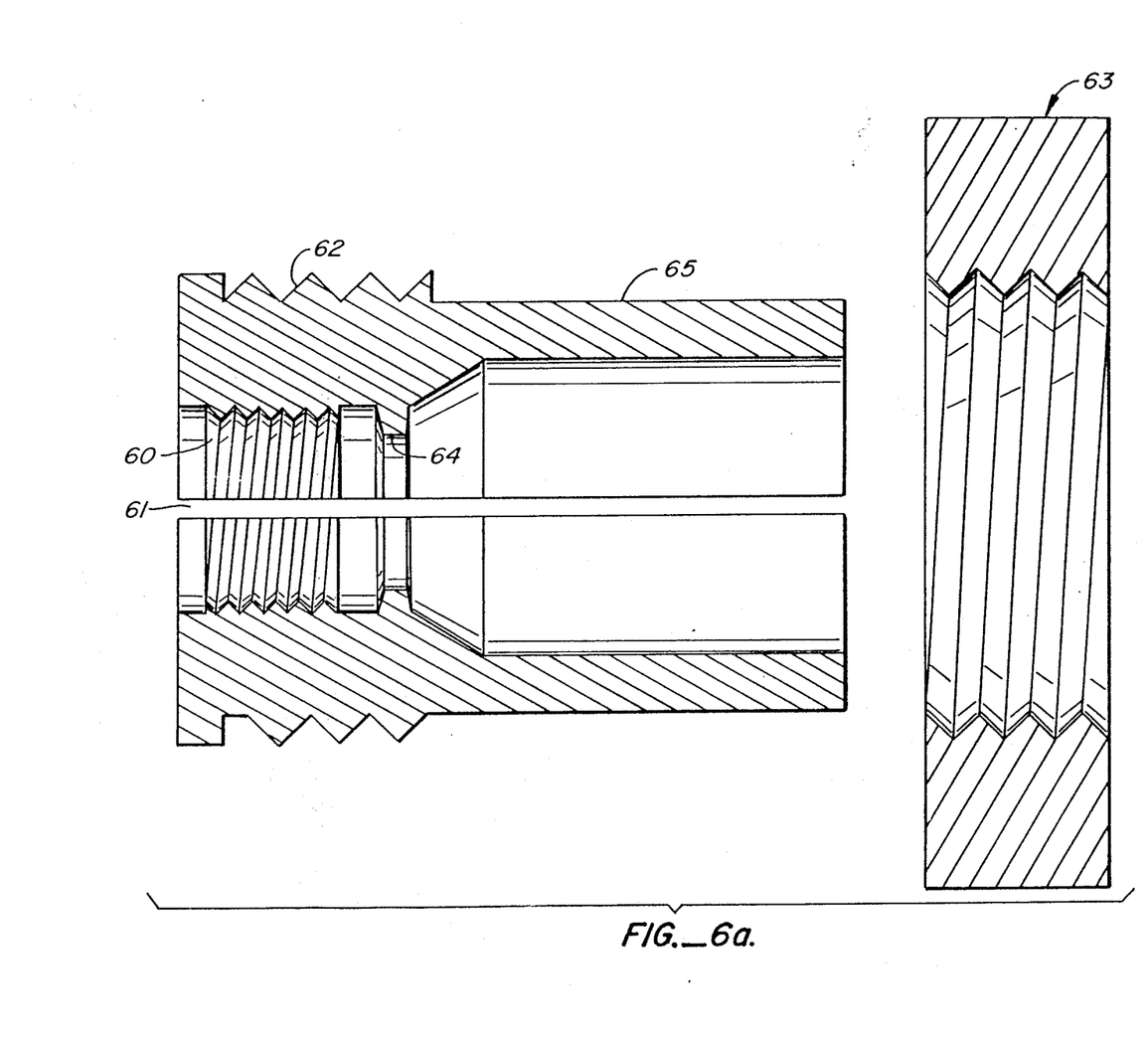
FIGS. 6a and 6b are cross-sections of the temporary coupling nut used as a temporary substitute for the coupling nuts of FIGS. 2 and 4, which embodiment is useful in factory polishing and preinstallation testing.
Figure 6B:
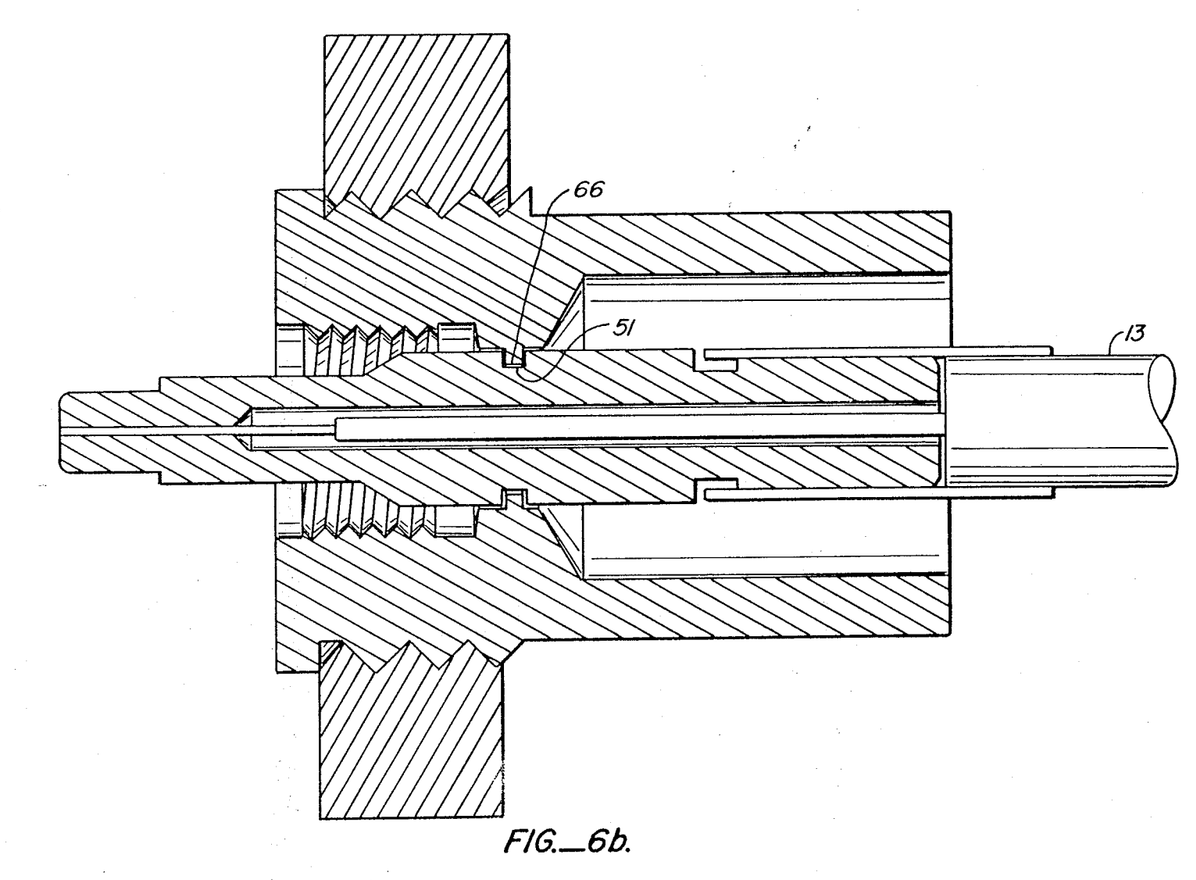

In still a further embodiment of the present invention a method is provided to temporarily connect the connector bodies shown in FIGS. 3 and 5 without installing the permanent corresponding coupling nuts as shown in FIGS. 1a and 1b, respectively. FIGS. 6a and 6b show cross-sections of the device before and after installation on the connector body, respectively. The device comprises coupling nut thread 60 substantially the same as that provided in the permanent coupling nuts 12 and 43. The entire coupling nut is split in half longitudinally at separation 61 to allow mounting and demounting on the connector body. This is accomplished by locating the waist 64 of both halves between the spring expansion ring 22 and the retainer 34. The hex nut 63 is slid over the rear body 65 of the device which may be provided with wrench flats and screwed onto threads 62 to secure the two halves in place.

The device in FIG. 6a is shown with a waist construction to accommodate the connector body shown in FIG. 3. The corresponding device for the connector body shown in FIG. 5 is shown installed in FIG. 6b by mating the waist 66 with the connector body groove 51.

One of the primary benefits and added advantages for the embodiments shown in FIGS. 6a and 6b is that the ultimate profile of the fully installed fiber optic cable may be completely duplicated in the factory before the permanent mating of the cable is effected. By duplicating this ultimate profile of the installed cable, the cable may be thoroughly tested for defects, etc. Such a configuration is also useful during the polishing and other tedious preparation steps which are required to ready the cable for further use even prior to the testing phase.

It should be understood that the internal configurations of the coupling nuts illustrated in FIGS. 6a and 6b are identical to those of nuts 43 and 12 with the only difference being that the nuts (with their internal configurations) have been dissected to make their installation over the connector body only temporary.

Figure 7C:
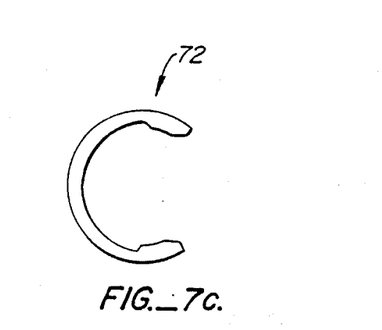
Figure 8A:
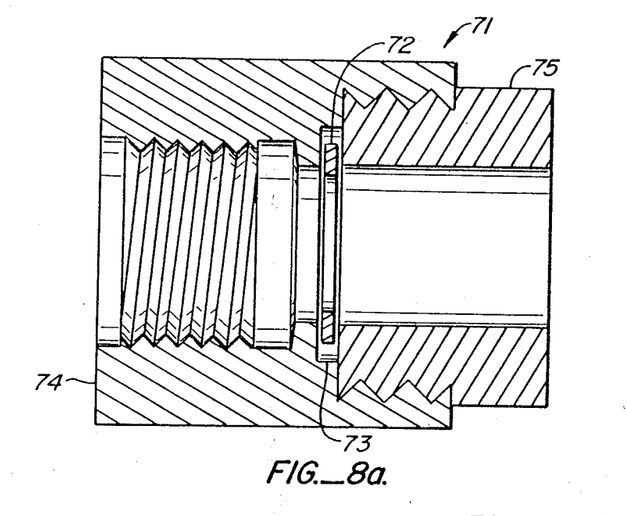
FIG. 8a is a cross-section of the removable coupling nut of FIG. 8b.
Figure 8B:
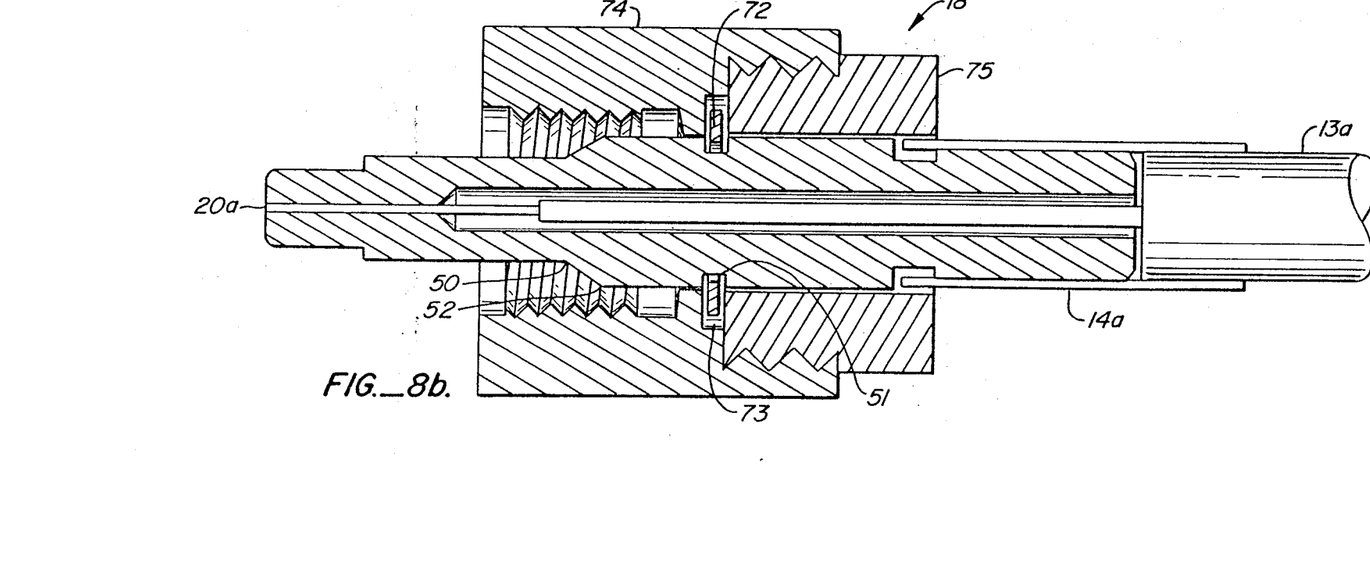
FIG. 8b is a cross-section of the connector and removable coupling nut in the captured condition for yet another embodiment of the invention.

In an even further embodiment of the present invention, reference is made to FIGS. 5, 7c, 8a, 8b and 8c of the drawings in detail. The connector-removable nut assembly, generally designated by reference numeral 18, comprises a combined fiber optic connector body 40 and removable coupling nut subassembly 71. Referring to FIGS. 5 and 8b, the assembly is mated to a fiber optic cable 13a with a crimp coupling 14a. The fiber optic cable contains a fiber 15a with a polished or otherwise well prepared end 20a covered by a buffer coat 21a which is partially stripped back to point 27a to facilitate fiber end preparation. As previously described, the fiber optic cable 13a may be a sub-unit of a multi-fiber cable in which the connector 18 may be one of several connectors terminating the multi-fiber cable end.

Referring to FIGS. 7c, 8a, 8b and 8c a spring expansion clip 72, a detailed illustration of which is shown in FIG. 7c, occupies an inner groove 73 of the coupling nut sub-assembly 71.

The inner groove 73 of the coupling nut subassembly 71 is formed by screwing the clip retaining nut 75 into the coupling nut body 74 which has a recessed annulus 73 into which the clip 72 is placed.

Figure 8C:
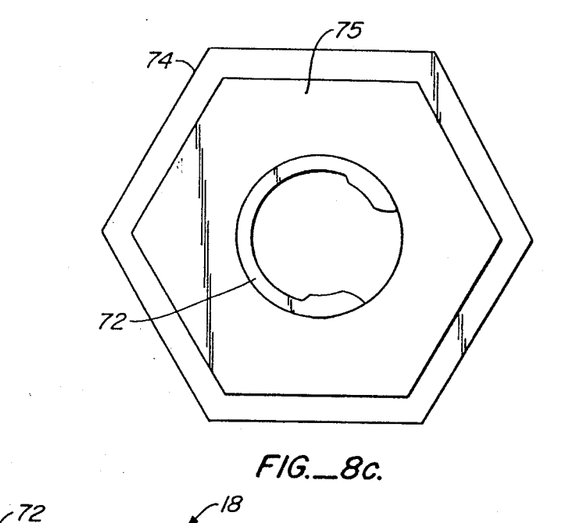

Coupling nut assembly 71 has a cross-section shown in FIG. 8c. The spring clip 72 has an inner diameter somewhat smaller than the diameter of the ramp crest 52 on connector body 40, of FIG. 5. The inner diameter of the clip is slightly larger than the diameter of the connector body of FIG. 5 at the base of the groove 51.

When in operation, the coupling nut subassembly 71 has spring clip 72 positioned in groove 73. Coupling nut sub-assembly 71 with spring clip 72 is slid over the end 20a of the connector body 40 (see FIG. 8b) and down to ramp 50 and ramp crest 52. As the unit assembly is forced past the ramp area, ramp 50 itself expands the inside diameter expansion clip 72 to the diameter of the ramp crest 52. At this point the outside diameter of spring clip 72 is somewhat less than the diameter of the inner groove 73 of the coupling nut 71. The coupling nut is then forced toward the cable end (generally shown at 13a) of the connector body until spring clip 72 snaps into groove 51.

The coupling nut assembly 71 is removed from connector body 40 by unscrewing clip retaining nut 75 using the hexagonal wrench flats of the coupling nut body 74 and clip retaining nut 75, shown in FIG. 8c. The coupling nut body is slid off the fiber end 20a of the connector body 40 exposing the spring clip 72 located in groove 51 of the connector body 40. The spring clip 72 is slid radially out of groove 51 allowing the clip retaining nut 75 to be slid off the connector body over the fiber end 20a.

One of the primary benefits and added advantages of the embodiments shown in FIGS. 7c, 8a, 8b and 8c is that permanent coupling of fiber optic cables as well as temporary operations, such as connector end polishing and pre-installation cable testing, may be accomplished using the same connector assembly.

It should be further understood that applicants have disclosed and described their invention making reference only to certain preferred embodiments of the invention and the best modes for carrying out the invention which are now known to applicants. However, applicants contemplate that there may be various other adaptations and alterations for the method and apparatus disclosed herein and claimed. Thus, applicants intend that all such adaptations and variations are all within the spirit of this invention and the appended claims. Applicants' invention is intended only to be limited by the appended claims and the equivalences thereof.

What is claimed is:

1. A new and improved apparatus for use in installing fiber optic cables, said apparatus comprising:

an elongated, generally cylindrical, body with means for securely affixing said body to a fiber optic cable;

said elongated body having a longitudinal bore generally parallel to the axis of said elongated body for receiving therethrough a fiber of the fiber optic cable;

a coupling nut having having means for mating with said elongated body and further means for connecting said fiber optic cable to a communication network device; and said elongated body further having means disposed along the outer surface of said body for interacting with the mating means of said nut an for receiving and securely retaining said coupling nut such that said fiber optic cable, together with said elongated body, may be connected by said nut to a communication network device; and wherein said coupling nut having an internal circumferential groove about its neck region and said groove having a diameter to contain a flexible retaining ring having an outer diameter substantially less than the outer diameter of said groove such that said ring in its expanded state is maintained in close proximity to the outer diameter of said groove;

said coupling nut receiving and retaining means of said elongated body further including at least one circumferential groove disposed about the outer mid-section surface of said elongated body; and said elongated body groove having an inner diameter slightly less than the inner diameter of said flexible ring supported in said neck region, and said elongated body having a bevelled ramp so that when said coupling nut with said flexible ring disposed about the groove in its neck region is received by said elongated body, said flexible ring will expand as it is slidably moved over the bevelled land along the elongated body to accommodate the larger outer diameter of the elongated body until said ring and coupling nut neck region are received by the groove in said elongated body where said flexible ring will return to its relaxed state and the coupling nut will be securely mated to said eleongated body.

2. A new improved apparatus for use in installing fiber optic cables, said apparatus comprising:
- an elongated, generally cylindrical, body with means for securely affixing said body to a fiber optic cable;
- said elongated body having a longitudinal bore generally parallel to the axis of said elongated body for receiving therethrough a fiber of the fiber optic cable;
- a coupling nut having for mating with said elongated body and further means for connecting said fiber optic cable to a communication network device;
- said coupling nut receiving and retaining groove means of said elongated body include at least two circumferential grooves disposed approximately about the mid-section of said body with each of said grooves having an outer diameter such that each will support a retaining ring with an inner diameter slightly less than the groove's outer diameter and with at least the ring in the first one of said grooves distal from the cable end of said body being flexible; and
- said coupling nut having a bevelled land in the nut's neck region with the bevelled land having a first and a second diameter and with the first diameter being less than the second diameter and with the first diameter of said nut being smaller and the second diameter being larger than the outer diameter of the retaining ring disposed about the first groove of said elongated body, such that when the nut is received by the elongated body, the nut is advanced along the longitudinal surface of the elongated body with the nut's bevelled land depressing and passing beyond the retaining ring of the first groove on the body and advancing toward the retaining ring in the second groove of the body where said second retaining ring is of a diameter that further movement of said nut along said elongated body towards the cable end of said body is prevented and said nut is positioned along said body with the bevelled land of said nut being captured between said first and second rings.

3. The apparatus of claim 2 wherein:
- said coupling nut mating means includes a bevelled land in the neck region of said nut with said bevelled land having first and second outer diameters with said first diameter being less than said second diameter;
- said elongated body receiving and retaining means including at least two circumferential grooves disposed about the outer surface of said body at a point approximately midway along the body;
- said circumferential grooves each having a diameter such that said grooves will receive a retaining ring and with the diameter of the first one of said grooves distal from the fiber optic cable end of said elongated body having a diameter slightly less than the diameter of the first one of said bevelled land diameters and with the outer diameter of the retaining ring of the second one of said grooves proximate the cable end of said body being slightly larger than the second one of said bevelled land diameters, such that when said nut is slidably received by said elongated body, said nut is advanced along the surface of the elongated body in the direction of the cable end of the body, with said bevelled region depressing the first of said retaining rings and advancing to the second ring where further movement of the nut along the body is prevented, thereby causing the bevelled region to be captured between the first and second retaining rings when said second ring prevents further movement of said nut in the direction of the cable end of said body.

4. A new and improved method for installing fiber optic cables comprising the following steps:
- securely attaching a fiber optic cable to one end of an elongated generally cylindrical connector body;
- extending a fiber through a longitudinal bore in the connector body such that an end of the fiber is exposed at the end of the connector body opposite the end to which the cable is attached;
- disposing circumferential means about the outer surface of the mid-section of said connector body for receiving and retaining a coupling nut in place about a portion of the connector body;
- disposing circumferential means about the interior surface of said coupling nut such that said coupling nut may be mated with the outer surface of said connector body; and wherein the steps of disposing circumferential means about the connector surface for receiving and retaining a coupling nut and the step of disposing circumferential means about the interior of the coupling nut include the following steps:
- circumferentially disposing at least one groove about the outer mid-section of said elongated body such that said groove has an outer diameter to support a flexible retaining ring having an internal diameter slightly smaller than the outer diameter of the groove;
- disposing a groove, having an inner diameter larger than the outer diameter of the connector body groove, circumferentially about the interior surface of said nut;
- disposing a flexible retaining ring, having an inner diameter slightly larger than the inner diameter of the connector body groove, about said groove of said coupling nut;
- disposing a bevelled land about said connector body having a first diameter proximate to said exposed fiber end, smaller than said inner diameter of said flexible retaining ring;
- said bevelled land having a second diameter approximately equal to the outer diameter of said connector body groove; and
- advancing said coupling nut with said flexible retaining ring in said nut groove along said connector body in the direction of the cable end of the body such that said flexible retaining ring expands to conform to said bevelled land until said retaining ring reaches said connector body groove where said ring will relax in said connector body groove to capture said nut in the position about said connector body.

5. The method as defined in claim 4 wherein the step of preparing the exposed fiber and polishisng the connector includes the following steps:
- dissecting the coupling nut in two halves;
- fitting each half of the coupling nut about a portion of the connector body's surface such that the groove(s) in the coupling nut is mated with the corresponding groove(s) and retaining means along the surface of the connector body, to form a complete coupling nut about the exterior surface of the connector body; and securely retaining the dissected halves of the coupling nut in place about the connector body such that the optical fiber and the connector may be prepared for installation in a communication network.

6. A new and improved method for instaling fiber optic cables comprising the following steps:

securely attaching a fiber optic cable to one end of an elongated generally cylindrical connector body;

extending a fiber through a longitudinal bore in the connector body such that an end of the fiber is exposed at the end of the connector body opposite the end to which the cable is attached;

disposing circumferential means about the outer surface of the mid-section of said connector body for receiving and retaining a coupling nut in place about a portion of the connector body;

disposing circumferential means about the interior surface of said coupling nut such that said coupling nut may be mated with the outer surface of said connector body; and wherein the steps of disposing circumferential means about the connector surface for receiving and retaining a coupling nut and the step of disposing circumferential means about the interior of the coupling nut, include the following steps:

circumferentially disposing at least two grooves about the outer mid-section of said elongated body with each grooves having an outer diameter such that each groove will support a retaining ring with an inner diameter slightly greater than the groove's outer diameter and with at least the ring in the first one of said grooves distal from the cable end of said body being flexible;

bevelling the neck region of the coupling nut such that the bevelled land of said neck region has a first diameter slightly larger than the cable end of the connector body, and a second diameter larger than the diameter of the flexible ring;

disposing a flexible retaining ring about the first one of said circumferential grooves in the connector body;

disposing a second retaining means about the second one of said grooves of the connector body;

slidably advancing the coupling nut along the elongated connector body from the end of said exposed fiber end towards the cable end of the connector body, depressing the first flexible retaining ring as the second diameter of said bevelled land passes over the flexible retaining ring as said bevelled land advances towards the second retaining means; and biasing further movement of said coupling nut by said retaining means to capture said bevelled land of the coupling nut between the first flexible retaining ring and the second retaining means.

7. The method as defined in claim 6 wherein the step of preparing the exposed fiber and polishing the connector includes the following steps:

dissecting the coupling nut in two halves;

fitting each half of the coupling nut about a portion of the connector body's surface such that the groove(s) in the coupling nut is mated with the corresponding groove(s) and retaining means along the surface of the connector body, to form a complete coupling nut about the exterior surface of the connector body; and securely retaining the disected halves of the coupling nut in place about the connector body such that the optical fiber and the connector may be prepared for installation in a communication network.

* * * * *